United States Patent [19]
Yanaka

(10) Patent No.: US 6,742,621 B2
(45) Date of Patent: Jun. 1, 2004

(54) ELECTRIC POWER STEERING DEVICE AND CONTROL METHOD THEREOF

(75) Inventor: Akihiro Yanaka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/197,800

(22) Filed: Jul. 19, 2002

(65) Prior Publication Data

US 2003/0042067 A1 Mar. 6, 2003

(30) Foreign Application Priority Data

Aug. 31, 2001 (JP) ........................................ 2001-263429

(51) Int. Cl.[7] ............................................... B62D 5/04
(52) U.S. Cl. .......................................... 180/446; 701/41
(58) Field of Search .................................. 180/443, 446; 701/41, 42, 44

(56) References Cited

U.S. PATENT DOCUMENTS

| | | | | |
|---|---|---|---|---|
| 6,155,377 A | * | 12/2000 | Tokunaga et al. | 180/446 |
| 6,302,441 B1 | * | 10/2001 | Kawamuro et al. | 280/771 |
| 6,439,336 B2 | * | 8/2002 | Noro et al. | 180/404 |
| 6,631,782 B1 | * | 10/2003 | Rieger | 180/446 |
| 2002/0121402 A1 | * | 9/2002 | Takeuchi et al. | 180/446 |

FOREIGN PATENT DOCUMENTS

| | | | |
|---|---|---|---|
| JP | B2 7-112822 | 2/1987 | |
| JP | A6-321118 | 11/1994 | |
| JP | A 9-254804 | 9/1997 | |

* cited by examiner

Primary Examiner—Daniel G. DePumpo
(74) Attorney, Agent, or Firm—Oliff & Berridge, PLC

(57) ABSTRACT

An electric power steering device includes a steering link that includes a plurality of connected steering shafts that connect a steering wheel to a steered wheel, a motor that provides a steering torque to assist the steering link, a torque sensor which is mounted to one of the steering shafts and which detects the steering torque of that steering shaft, a steering angle sensor which is mounted to one of the steering shafts and which detects a steering angle of that steering shaft, a calculating unit that calculates a steering assist amount based on the steering torque detected by the torque sensor, the steering angle detected by the steering angle sensor, and predetermined crossed axes angles between the connected steering shafts, and a motor controller that drives the motor so as to apply a steering assist force to the steering link based on the steering assist amount. As a result, it is possible to correct the torque by a simple method.

6 Claims, 6 Drawing Sheets

ELECTRIC POWER STEERING DEVICE AND CONTROL METHOD THEREOF

INCORPORATION BY REFERENCE

The disclosure of Japanese Patent Application No. 2001-263429 filed on Aug. 31, 2001, including the specification, drawings and abstract is incorporated herein by reference in its entirety.

BACKGROUND OF THE INVENTION

1. Field of Invention

The invention relates to an electric power steering device that corrects, via a motor, a torque variation in a steering link in an automobile, as well as to a control method thereof.

2. Description of Related Art

An electric power steering device that generates a steering assist force using a motor, such as that disclosed in Japanese Patent Application Laid-Open Publication No. 9-254804, has conventionally been known. In this electric power steering device, a first shaft, which is connected to a steering wheel, is connected to a second shaft by a first universal joint, and the second shaft is connected to a third shaft by a second universal joint, such that a steering link having a plurality of steering shafts is constructed. A torque sensor and a steering angle sensor are then provided on the first shaft and a motor that applies a steering assist force to a link that transmits rotational torque from the steering link to the wheels is provided on that link.

This electric power steering device is also provided with a control unit that includes a control circuit, memory, and a drive circuit. In the memory is stored mapped torque correction data in order to obtain a rotational torque variation of the third shaft with respect to the steering force input to the first shaft. The control circuit determines an assist torque value based on a torque detection signal from the torque sensor, an angle detection signal from the steering angle sensor, and the torque correction data from the memory. The drive circuit then drives the motor based on that assist torque value. It is in this way that the steering assist force is obtained.

With the foregoing electric power steering device, however, because the torque is corrected using mapped torque correction data, new torque correction data must be created every time the configuration is changed, e.g., every time the length of the steering shafts or the angle between them and the like are changed, that corresponds to that change, which is troublesome. Moreover, creating that torque correction data based on experimental values increases the number of man-hours increases even more.

Still further, with an electric power steering device that is provided with a variable-ratio steering mechanism that changes the phase between the steering wheel and the end of the steering link opposite the steering wheel, it is extremely difficult to create appropriate correction data, and what is more, the mounting positions of the torque sensor and the steering angle sensor are limited.

SUMMARY OF THE INVENTION

In view of the foregoing problems, it is an object of this invention to provide an electric power steering device i) in which torque correction is possible by a simple method, ii) in which a torque sensor, a steering sensor, and a motor, and the like can be mounted to any portion of one of the steering shafts, and iii) which can also be provided with a variable-ratio steering mechanism.

In order to achieve the foregoing objects, an electric power steering device is provided that includes i) a steering link which includes a plurality of connected steering shafts that connect the steering wheel with the steered wheels, ii) a motor that provides a steering torque to assist the steering link, iii) a torque sensor which is provided on one of the steering shafts and which detects a steering torque of the steering shaft, iv) a steering angle sensor which is provided on one of the steering shafts and which detects a steering angle of the steering shaft, v) a calculating unit that calculates a steering assist amount based on the steering torque detected by the torque sensor, the steering angle detected by the steering angle sensor, and predetermined crossed axes angles between the connected steering shafts, and vi) a motor controller that drives the motor so as to apply a steering assist force to the steering link.

In addition, a control method is provided for an electric power steering device including a steering link that includes a plurality of connected steering shafts that connect the steering wheel with the steered wheels, a motor that provides a steering torque to assist the steering link, a torque sensor which is provided on one of the steering shafts and which detects a steering torque of that steering shaft, and a steering angle sensor which is provided on one of the steering shafts and which detects a steering angle of that steering shaft, includes the steps of calculating a steering assist amount based on the steering torque detected by the torque sensor, the steering angle detected by the steering angle sensor, and predetermined crossed axes angles between the connected steering shafts, and driving the motor so as to apply a steering assist force to the steering link based on that steering assist amount.

According to an electric power steering device having the above described configuration and the above-described control method thereof, because the steering assist amount is obtained by calculation from the steering torque, the steering angle, and the crossed axes angle between each of the steering shafts, an appropriate assist force can always be applied to the steering link irrespective of the positional relationship, e.g., the crossed axes angle, between each of the steering shafts, thus giving the driver a uniformly stable steering feel. In addition, because the steering assist amount is calculated based on the steering torque that is detected by the torque sensor, the steering angle that is detected by the steering angle sensor, and the crossed axes angle between the steering shafts, the mounting locations of the torque sensor and the steering angle sensor are able be anywhere on the steering shafts, which improves the degree of freedom in the design of the construction.

BRIEF DESCRIPTION OF THE DRAWINGS

The above-mentioned embodiment and other embodiments, objects, features, advantages, technical and industrial significance of this invention will be better understood by reading the following detailed description of the preferred embodiments of the invention, when considered in connection with the accompanying drawings, in which.

DETAILED DESCRIPTION OF PREFERRED EMBODIMENTS

In the following description and the accompanying drawings, the present invention will be described in more detail in terms of exemplary embodiments.

Figure 1:
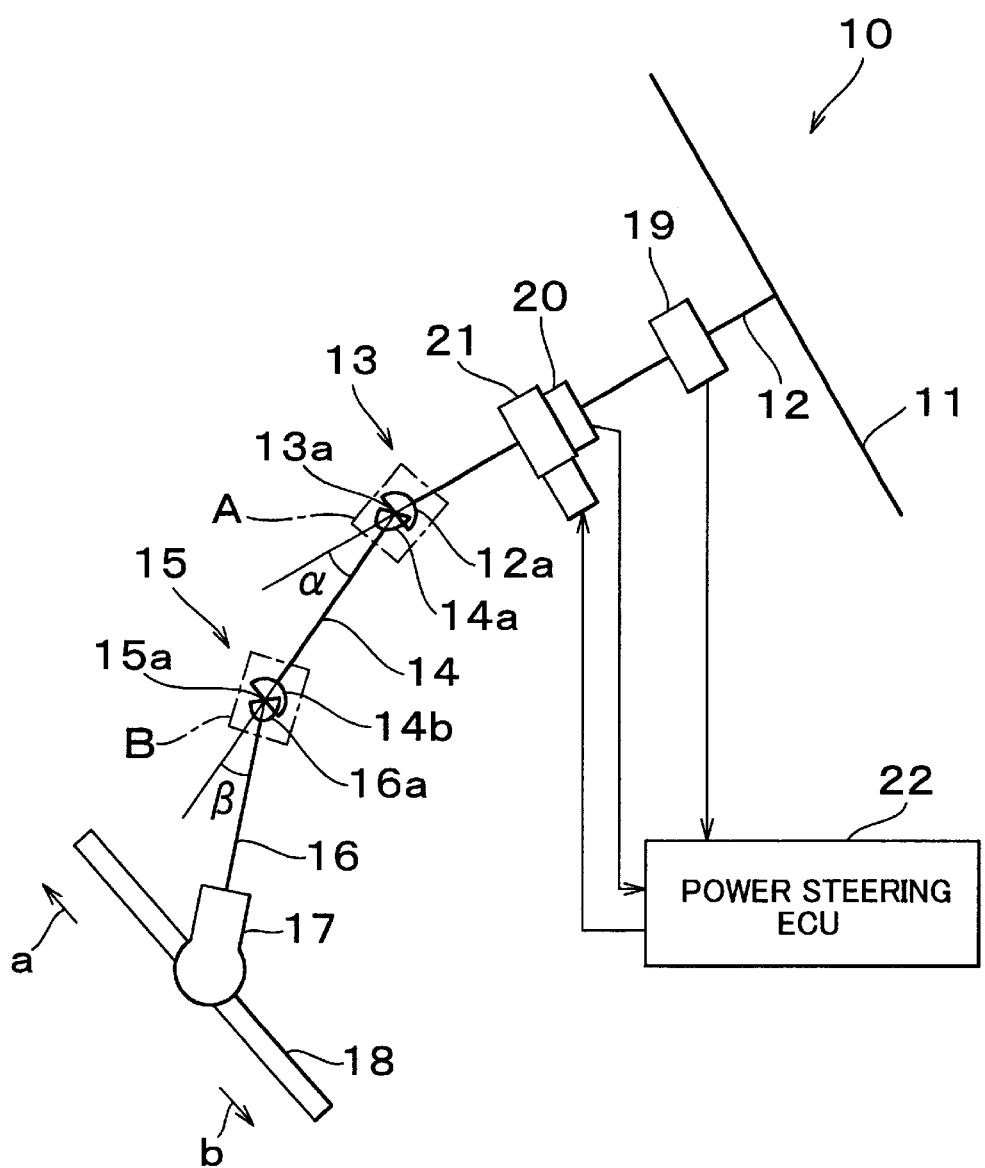
FIG. 1 is a schematic view of an electric power steering device according to a first embodiment of the invention.
Figure 2:
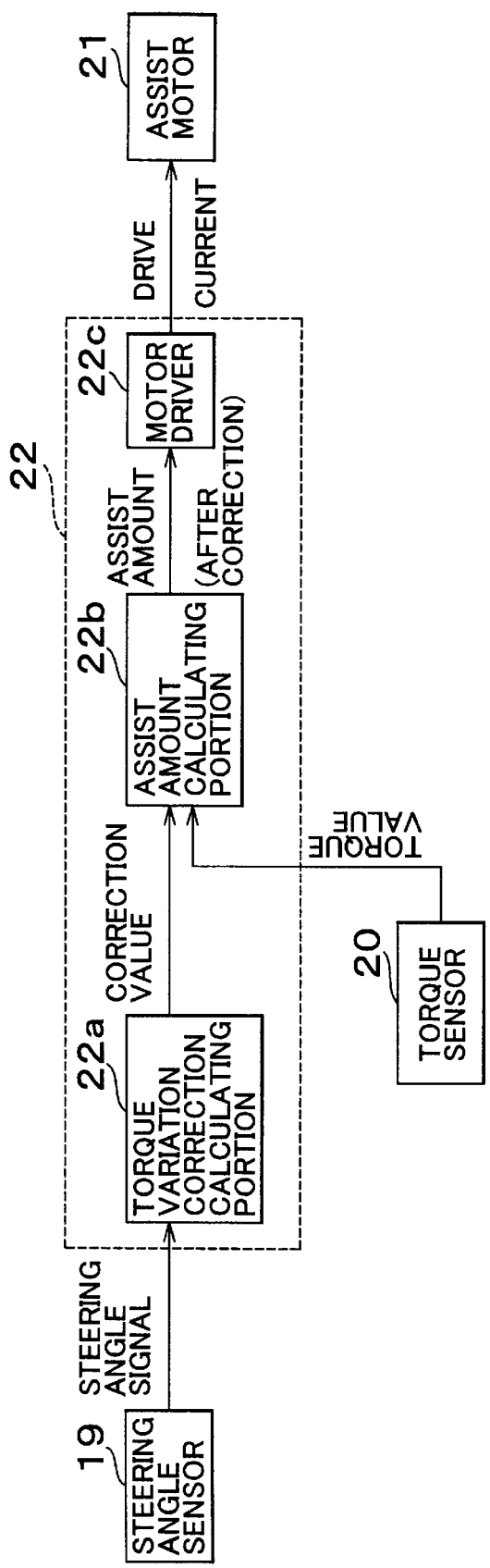
FIG. 2 is a block diagram of the functions of the electric power steering device according to the first embodiment of the invention.

Hereinafter, a first exemplary embodiment of the invention will be described with reference to the accompanying drawings. FIG. 1 is a schematic view of an electric power steering device 10 according to a first embodiment of the invention, and FIG. 2 is a block diagram of the functions of the electric power steering device 10 shown in FIG. 1.

In the electric power steering device 10, a lower end portion of a main shaft 12, which is connected to a steering wheel 11, is connected to an upper end portion of a mid shaft 14 via a first universal joint 13. A lower end portion of the mid shaft 14 is connected to an upper end portion of an extension shaft 16 via a second universal joint 15. A lower end portion of the extension shaft 16 is connected to a pinion gear which is housed within a gear box 17 and which engages with a rack bar 18.

Therefore, when the steering wheel 11 is turned, the rotational force is transmitted to the extension shaft 16 via the main shaft 12, first universal joint 13, mid shaft 14, and second universal joint 15 so as to turn the pinion gear in the gear box 17. The turning of the pinion gear in the gear box 17 selectively moves the rack bar 18 in the directions of arrows a and b, which in turn changes the direction of the steered wheels, not shown. The steering link includes the three steering shafts, which are the main shaft 12, the mid shaft 14, and the extension shaft 16. Also in the figure, the crossed axes angle of the main shaft 12 and the mid shaft 14 is denoted as $\alpha$, and the crossed axes angle of the mid shaft 14 and the extension shaft 16 is denoted as $\beta$.

The first universal joint 13 is constructed such that a yoke joint 12a, which is connected to the lower end of the main shaft 12 and which rotates integrally therewith, is connected via a cross-pin 13a to a yoke joint 14a, which is connected to the upper end of the mid shaft 14 and which rotates integrally therewith. Also, the second universal joint 15 is constructed such that a yoke joint 14b, which is connected to the lower end of the mid shaft 14 and which rotates integrally therewith, is connected via a cross-pin 15a to a yoke joint 16a, which is connected to the upper end of the extension shaft 16 and which rotates integrally therewith.

Mounted to the main shaft 12 are a steering angle sensor 19 that detects a rotation angle of the main shaft 12 when the steering wheel 11 is turned, a torque sensor 20 that detects a steering torque of the main shaft 12, and an assist motor 21 which is a motor that applies a steering assist force to the main shaft 12. The steering angle sensor 19, torque sensor 20, and assist motor 21 are each connected to a power steering ECU (electronic control unit) 22.

The power steering ECU 22 utilizes a computer, which is run according to a program routine, as its main component. When shown in a function block diagram such as that in FIG. 2, the power steering ECU 22 includes a torque variation correction calculating portion 22a, an assist amount calculating portion 22b, and a motor driver 22c that functions as motor driving means. The torque variation correction calculating portion 22a receives as a steering angle signal a rotation angle $\theta$ of the main shaft 12 that is detected by the steering angle sensor 19 and calculates a correction value using the prerecorded crossed axes angles $\alpha$ and $\beta$ and a (initial) phase of the upper and lower yokes. The torque variation correction calculating portion 22a then sends this correction value to the assist amount calculating portion 22b.

The assist amount calculating portion 22b receives this correction value sent from the torque variation correction calculating portion 22a as well as a signal indicative of a torque value T detected by the torque sensor 20. The assist amount calculating portion 22b then calculates an assist amount based on these signals and sends a signal indicative of that assist amount to the motor driver 22c. The motor driver 22c then sends the signal received from the assist amount calculating portion 22b to the assist motor 21 as a signal indicative of a drive current so as to drive the assist motor 21.

In the above configuration, when the crossed axes angle of the main shaft 12 and the mid shaft 14, or the crossed axes angle of the mid shaft 14 and the extension shaft 16 is denoted as $\alpha$, the input/output relationship of the torque with the first universal joint 13 or the second universal joint 15 can be expressed with Expression 1.

$$f(\alpha, \theta in) = Tout/Tin = \cos\alpha/(1-\sin^2\theta in \times \sin^2\alpha) \qquad \text{[Expression 1]}$$

Figure 3:
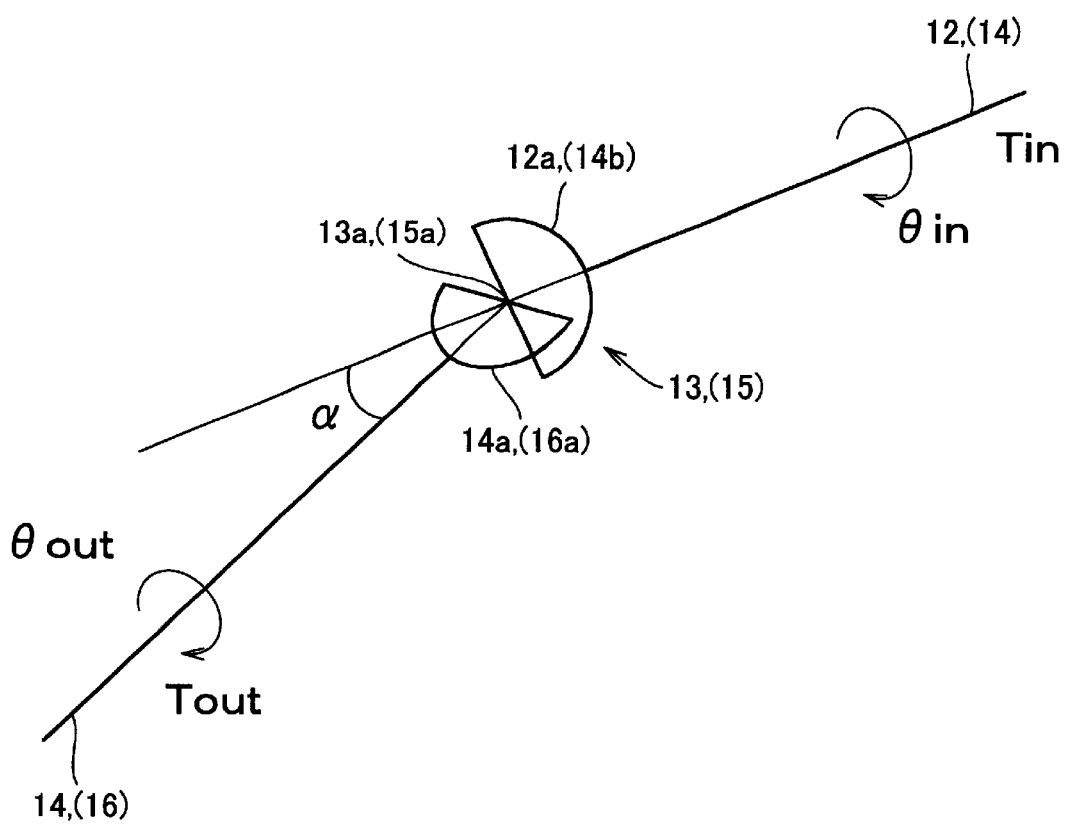
FIG. 3 is an explanatory view showing a state in which torque is being transferred between the steering shafts according to the first embodiment of the invention.

In both FIG. 3 and Expression 1, Tin denotes the torque of the shaft on the input side (the main shaft 12 or the mid shaft 14) and Tout denotes the torque of the shaft on the output side (the mid shaft 14 or the extension shaft 16). Also, $\theta$in denotes the rotation angle of the shaft on the input side. In this case, the torque variation Tout/Tin with respect to the input angle $\theta$in shown in Expression 1 changes in 180 degree cycles, as shown in FIG. 4.

Figure 4:
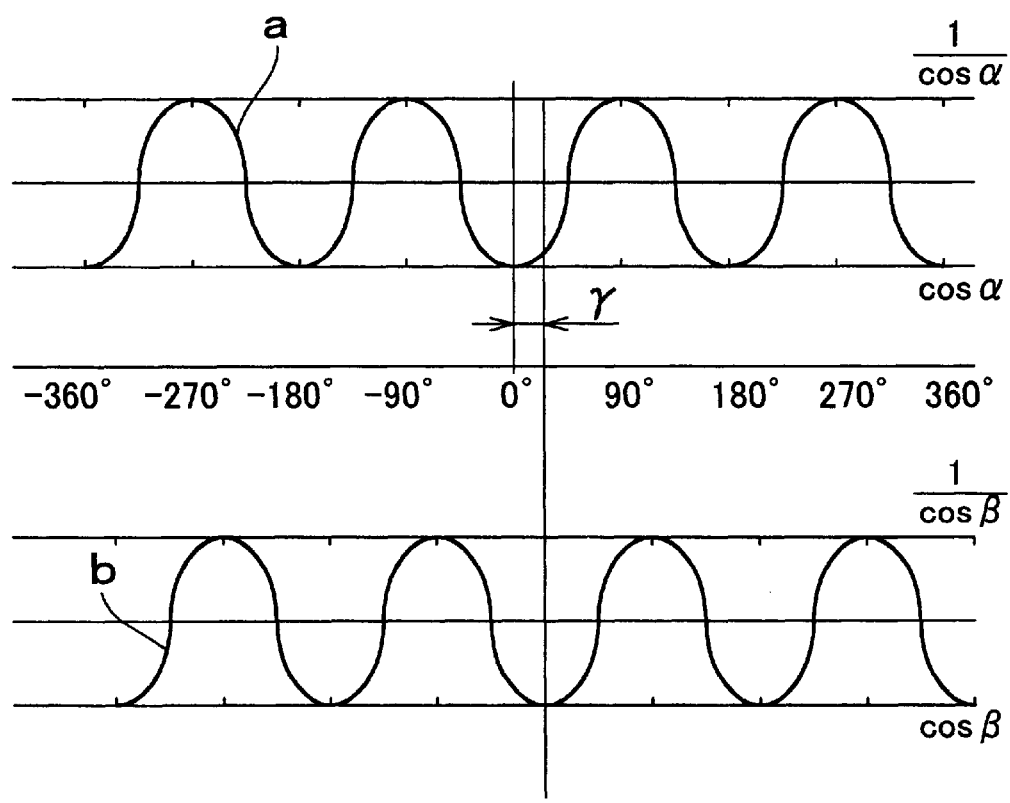
FIG. 4 is a line graph of the characteristics of the torque ratio with respect to the shaft rotation according to the first embodiment of the invention.

Here, the input/output ratio of torque with the first universal joint 13 shown in FIG. 1 with respect to the angle of the yoke joint 12a referenced when the yoke joint 12a is orthogonal to a plane A that includes the main shaft 12 and the mid shaft 14 is expressed with curve a in FIG. 4. Also, the input/output ratio of torque with the second universal joint 15 with respect to the angle of the yoke joint 14b referenced when the yoke joint 14b is orthogonal to a plane B that includes the mid shaft 14 and the extension shaft 16 is expressed with curve b in FIG. 4. The phase difference between curve a and curve b is denoted as $\gamma$. The rotation angle of the input/output shaft at each yoke is expressed with Expression 2 below.

$$g(\alpha, \theta in) = \theta out = \tan^{-1}\{\tan\theta in \times \cos\alpha\} \qquad \text{[Expression 2]}$$

$\theta$out denotes the rotation angle of the shaft on the output side, which in this case, is the rotation angle of the mid shaft 14 or the extension shaft 16. In this way, because the torque ratio and the rotation angle can be expressed with Expression 1 and Expression 2, Expression 1 and Expression 2 can be used to obtain the torque variation of the main shaft 12 and the extension shaft 16. That is, by denoting the torque of the main shaft 12 as a column shaft torque T1 and its rotation angle as $\theta$1, denoting the torque of the mid shaft 14 as T2 and its rotation angle as $\theta$2, and denoting the torque of the extension shaft 16 as T3 and its rotation angle as $\theta$3, the mutual relationships between the torque T1, the torque T2, and the torque T3 can be expressed with the following expressions. First, the torque variation T2/T1 of the main shaft 12 and the mid shaft 14 can be expressed by the function in Expression 3 below.

$$T2/T1=f(\alpha, \theta1) \quad \text{[Expression 3]}$$

Also, a rotation angle variation expression g is expressed by $\theta2=g(\alpha, \theta1)$. Next, the torque variation T3/T2 of the mid shaft 14 and the extension shaft 16 can be expressed by the function in Expression 4 below.

$$T3/T2=f(\beta, \gamma+\theta2) \quad \text{[Expression 4]}$$

Therefore, the torque variation T3/T1 of the main shaft 12 and the extension shaft 16 can be obtained by multiplying Expression 3 by Expression 4, which results in Expression 5 below.

$$T3/T1=f(\alpha, \theta1)\times f(\beta, \gamma+\theta2)\times F(\theta1) \quad \text{[Expression 5]}$$

In the foregoing expressions, f denotes the torque ratio expression and g denotes the rotation angle variation expression. Therefore, according to Expression 5 it is possible to obtain the torque variation of the main shaft 12 and the extension shaft 16. The target assist amount when there is no torque variation in the steering link will be referred to as "basic assist amount." The correction value that corrects the assist motor 21 is obtained from the obtained torque variation. The motor driving current corresponding to the basic assist amount and the correction value flows to the assist motor 21 so as to drive the assist motor 21. As a result, the target assist is able to be implemented without generating torque variation in the main shaft 12.

The assist amount reduces the steering force required by a driver to turn the steering wheel such that the sum of this assist amount and manual torque provided by the driver is the output torque applied to the main shaft 12. Therefore, the relationship between this manual torque M, the motor assist torque PS (M, θ1) and column shaft torque T1 (θ1) is expressed with the following expressions.

$$M+PS(M, \theta1)=T1(\theta1) \quad \text{[Expression 6]}$$

$$T3=F(\theta1)=F(\theta1)\times(M\times PS(M, \theta1)) \quad \text{[Expression 7]}$$

$$PS(M, \theta1)=T3/F(\theta1)-M \quad \text{[Expression 8]}$$

By making the target value of T3 with respect to M an assist ratio As(M) function, Expression 9 below can be obtained. Here, the assist ratio As(M) function is usually determined by a preset expression or map.

$$T3=As(M) \quad \text{[Expression 9]}$$

$$\subset PS(M, \theta1)=As(M)/F(\theta1)-M$$

The manual torque M is a torque value detected by the torque sensor 20. Therefore, by controlling the assist amount output to the assist motor 21 based on this theoretical expression so as to become PS(M, θ1), the driver is able to steer smoothly without an unpleasant sensation from torque variation. In this case, the calculation process for the torque variation T3/T1=F(θ1) is performed by the torque variation correction calculating portion 22a and the calculation process for the motor assist torque PS(M, θ1) is performed by the assist amount calculating portion 22b.

Accordingly, with the electric power steering device 10 according to this exemplary embodiment, the assist amount is obtained by a calculation based on the crossed axes angle α of the main shaft 12 and the mid shaft 14, the crossed axes angle β of the mid shaft 14 and the extension shaft 16, the rotation angle of the main shaft 12 that is detected by the steering angle sensor 19, and the torque of the main shaft 12 that is detected by the torque sensor 20. Then, assist force is output from the assist motor 21 in accordance with this assist amount. Obtaining the assist amount based on the theoretical expression in this way enables the torque correction to be obtained simply without the need to create large amounts of data and perform complicated control, as is the case with the related art. Also, because the calculation process can be performed in accordance with the configuration of the steering link, the torque is able to be corrected irrespective of the configuration of the steering link.

The control described above is with a column-type electric power steering device in which the steering angle sensor 19, the torque sensor 20, and the assist motor 21 are mounted to the main shaft 12. According to another exemplary embodiment, however, the steering angle sensor 19, the torque sensor 20, and the assist motor 21 can also be mounted to another portion other than the main shaft 12. For example, with a pinion-type electric power steering device in which only the steering angle sensor 19 is mounted to the main shaft 12 and the torque sensor 20 and the assist motor 21 are provided on a portion where the pinion gear in the gear box 17 and the rack bar 18 are connected, the assist amount can be obtained according to the following Expression 10.

$$T3+Ps(\theta1=Tp, Tp=As(M) \quad \text{[Expression 10]}$$

Tp in Expression 10 denotes a pinion engaging torque. From Expression 5 is obtained the expression T3=F(θ1)×T1, and from this expression and Expression 10 is obtained the expression Tp=F(θ1)×T1+Ps(θ1), such that Expression 11 below is obtained.

$$PS(M, \theta1)=Tp-F(\theta1)\times T1=Tp-F(\theta1)\times M \quad \text{[Expression 11]}$$

$$\subset PS(M, \theta1)=As(M)-F(\theta1)\times M$$

By obtaining F(θ1) using Expressions 1 and 5, the motor assist torque PS(M, θ1) can be obtained.

In this way, with the electric power steering device 10 according to the first exemplary embodiment, the torque can be corrected appropriately even when the torque sensor 20 and the assist motor 21 are mounted to a portion other than the main shaft 12. Further, the torque sensor 20 and the assist motor 21 can be mounted to the mid shaft 14 and the steering angle sensor 19 can also be mounted to a portion other than the main shaft 12. In this case, a suitable assist amount can be calculated by simply modifying the foregoing expression such that the mounting positions of the steering angle sensor 19, the torque sensor 20, and the assist motor 21 no longer become restricted.

Figure 5:
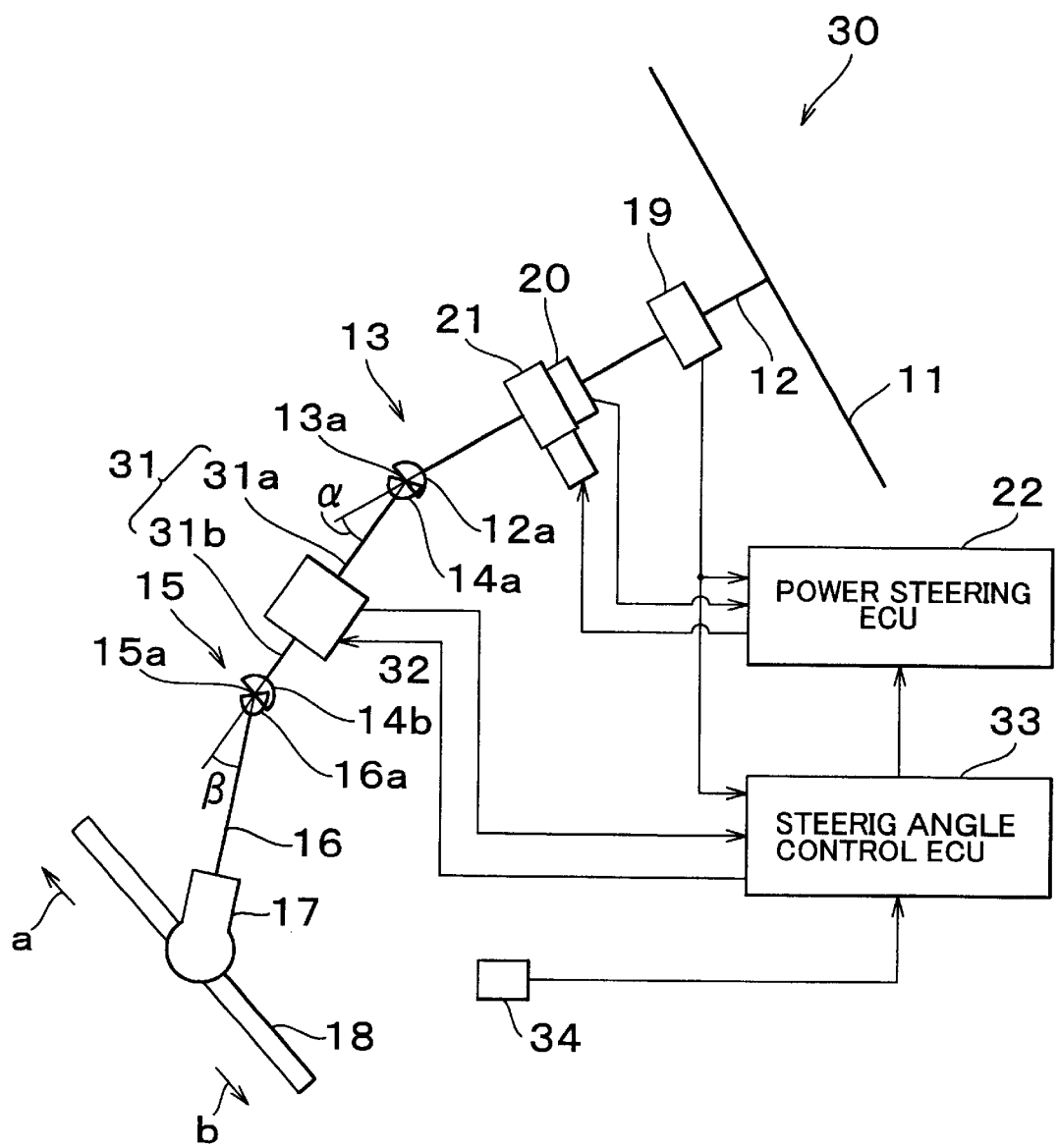
FIG. 5 is a schematic view of an electric power steering device according to a second embodiment of the invention.
Figure 6:
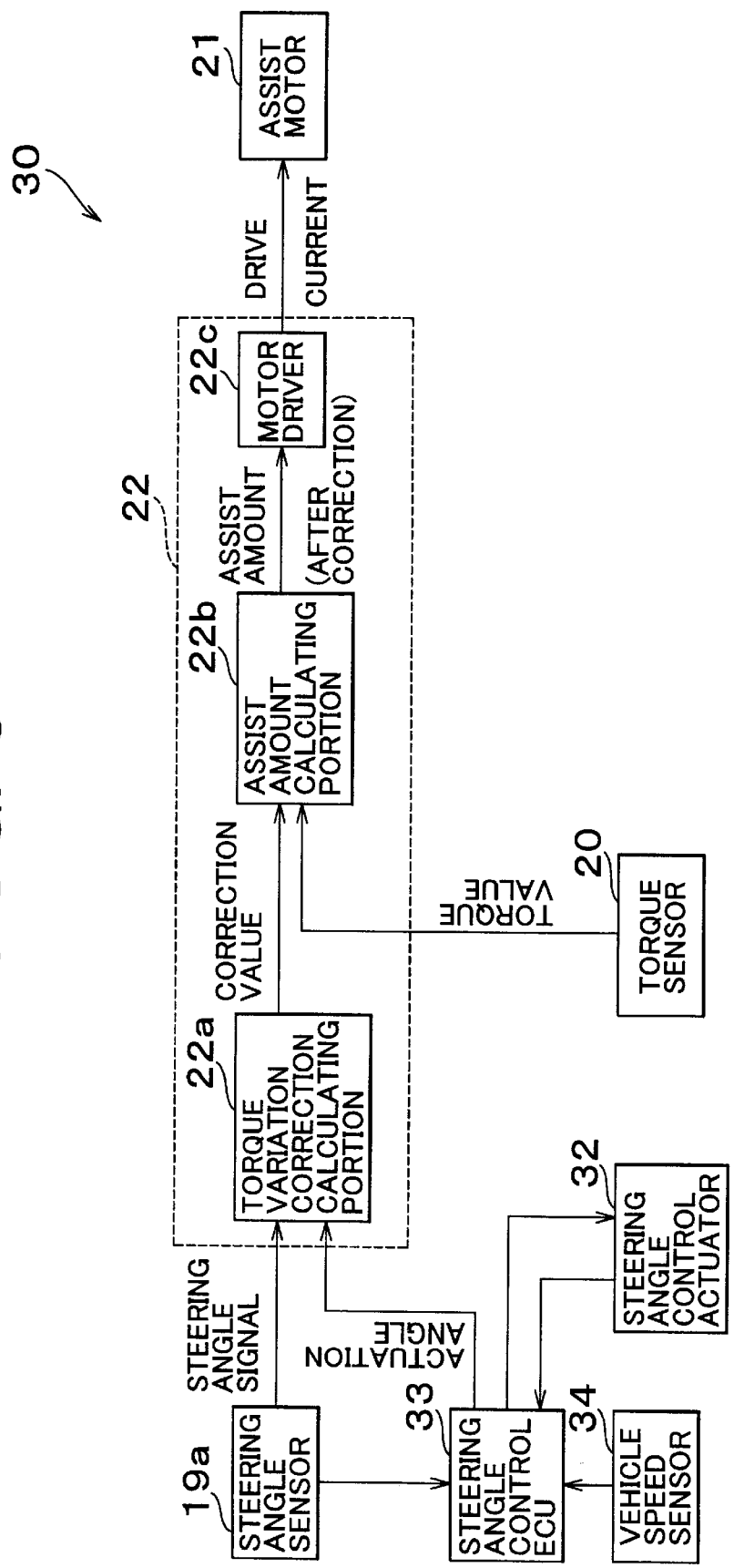
FIG. 6 is a block diagram of the functions of the electric power steering device according to the second embodiment of the invention.

Further, FIG. 5 and FIG. 6 show an electric power steering device 30 according to a second exemplary embodiment of the invention. With this electric power steering device 30, a steering angle control actuator 32 is mounted to a mid shaft 31 so as to enable a phase of an upper side portion 31a and a lower side portion 31b of the mid shaft 31 to change. This mid shaft 31 and steering angle control actuator 32 together serve as a variable-ratio steering mechanism which enables control such that when the steering wheel 11 is turned one complete revolution the extension shaft 16 will rotate two complete revolutions, for example.

The steering angle control actuator 32 is then connected to a steering angle control ECU 33 that controls the steering angle control actuator 32. The steering angle control ECU 33 is also connected to a vehicle speed sensor 34, the steering angle sensor 19, and the power steering ECU 22. The configuration of other parts in this electric power steering device 30 is the same as with the aforementioned electric power steering device 10 and like parts will be denoted with like reference numerals.

The steering angle control ECU 33 receives a steering angle signal indicative of the rotation angle of the main shaft 12 that is detected by the steering angle sensor 19. The steering angle control ECU 33 also receives a vehicle speed signal indicative of the vehicle speed that is detected by the vehicle speed sensor 34. The steering angle control ECU 33 then calculates a current value based on the steering angle signal and the vehicle speed signal to actuate the steering angle control actuator 32, and then sends a signal indicative of the calculated current value to the steering angle control actuator 32 so as to actuate it. The steering angle control ECU 33 also receives a signal indicative of the operation angle of the mid shaft 31 that rotates with the actuation of the steering angle control actuator 32, and then outputs it to the power steering ECU 22.

Further, the steering angle control ECU 33 controls the actuation angle of the steering angle control actuator 32 so that it, for example, rotates a large amount in the direction of the main shaft rotation with respect to the main shaft rotation angle when the vehicle is running at slow speeds, and only slightly, or in the reverse direction, when the vehicle is running at high speeds.

Also, when the steering angle control actuator 32 is actuated and the phase of the upper side portion 31a and the lower side portion 31b of the mid shaft 31 have changed, the steering angle control ECU 33 takes the actuation angle of the mid shaft 31 as a relative angle by a calculation process and sends a signal indicative of that actuation angle to the torque variation correction calculating portion 22a. This actuation angle is an actuation angle sensor value within the steering angle control actuator 32 that is generated as a result of the steering angle control ECU 33 driving the steering angle control actuator 32, or an actuation command value of the steering angle control ECU 33 (or a drive control value).

The torque variation correction calculating portion 22a then obtains the torque variation by a calculation process using the steering angle signal from the steering angle sensor 19 and the actuation angle signal from the steering angle control ECU 33, and sends a signal indicative of the obtained data to the assist amount calculating portion 22b. This is done by modifying Expression 4 to $T3/T2=f(\beta,\gamma+\theta2+\epsilon)$. $\epsilon$ denotes the actuation angle of the steering angle control actuator 32. Thereafter, just as with the control in electric power steering device 10, the assist amount calculating portion 22b receives a signal sent from the torque variation correction calculating portion 22a and a torque signal indicative of the torque that is detected by the torque sensor 20, and calculates the assist amount from these signals. The assist amount calculating portion 22b then outputs a signal indicative of that assist amount to the motor driver 22c, which in turn sends the received signal as a drive current signal to the assist motor 21 to drive the assist motor 21.

The torque variation T3/T1 and the motor assist torque PS(M, $\theta1$) in this case are able to be obtained using Expressions 1 through 11. In this way, with the electric power steering device 30 according to this exemplary embodiment, the torque is able to be corrected appropriately even when a variable-ratio steering mechanism is provided, so that the driver is always able to have a steering sensation with no unpleasantness. Further, this can also be applied in the same way and with the same advantages when there are three or more joints.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configuration, which are exemplary, other combinations and configurations, including more, less or only a single element, are also within the spirit and scope of the invention.

What is claimed is:

1. An electric power steering device, comprising:

a steering link including a plurality of connected steering shafts that connect a steering wheel to a steered wheel;

a motor that provides a steering torque to assist the steering link;

a torque sensor which is provided on one of the steering shafts and which detects the steering torque of that steering shaft;

a steering angle sensor which is provided on one of the steering shafts and which detects a steering angle of that steering shaft;

a calculating unit that calculates a steering assist amount based on the steering torque detected by the torque sensor, the steering angle detected by the steering angle sensor, and predetermined crossed axes angles between the connected steering shafts; and a motor controller that drives the motor so as to apply a steering assist force to the steering link based on the steering assist amount.

2. The electric power steering device according to claim 1, wherein the calculating unit calculates the steering assist amount based on an assist ratio which is a target value for an output torque of the steering link with respect to the steering torque.

3. The electric power steering device according to claim 2, wherein the assist ratio is set beforehand according to an operational expression.

4. The electric power steering device according to claim 2, wherein the assist ratio is set beforehand according to a map.

5. The electric power steering device according to claim 1, further comprising:

a variable-ratio steering mechanism which is provided on any one of the steering shafts and which can change a phase relationship between both end portions of the steering shaft; and a variable-ratio steering mechanism controller that drives the variable-ratio steering mechanism, corrects a variation amount in the phase of the steering shaft, and sends a corrected data thereof to the calculating unit.

6. The electric power steering device according to claim 5, further comprising:

a vehicle speed sensor that detects a speed of a vehicle, wherein the variable-ratio steering mechanism changes the phase relationship between both end portions of the steering shaft based on the detected steering angle and the detected vehicle speed.

* * * * *